US008568111B2

United States Patent
Knoop

(10) Patent No.: US 8,568,111 B2
(45) Date of Patent: Oct. 29, 2013

(54) FLUID FLOW MACHINE

(75) Inventor: Andreas Knoop, Esslingen (DE)

(73) Assignee: Daimler AG, Stuttgart (DE)

( * ) Notice: Subject to any disclaimer, the term of this patent is extended or adjusted under 35 U.S.C. 154(b) by 638 days.

(21) Appl. No.: 12/523,677

(22) PCT Filed: Jan. 19, 2007

(86) PCT No.: PCT/EP2007/000455
§ 371 (c)(1),
(2), (4) Date: Jul. 17, 2009

(87) PCT Pub. No.: WO2008/086826
PCT Pub. Date: Jul. 24, 2008

(65) Prior Publication Data
US 2010/0111725 A1     May 6, 2010

(51) Int. Cl.
*F04B 17/00* (2006.01)
*F04B 35/00* (2006.01)
(52) U.S. Cl.
USPC ...... 417/365; 417/366; 417/423.12; 384/113; 384/321
(58) Field of Classification Search
USPC ............ 417/365, 366, 423.12, 374, 406; 384/100, 105, 121, 113, 317, 321, 476, 384/900
See application file for complete search history.

(56) References Cited

U.S. PATENT DOCUMENTS

| | | | | |
|---|---|---|---|---|
| 2,799,227 A * | 7/1957 | Allen | | 417/357 |
| 3,597,026 A * | 8/1971 | Jarosh | | 384/415 |
| 3,911,300 A * | 10/1975 | Lebkuchner | | 310/86 |
| 4,047,847 A * | 9/1977 | Oikawa | | 417/370 |
| 4,575,315 A * | 3/1986 | Galais et al. | | 417/365 |
| 4,958,988 A * | 9/1990 | Regev | | 417/53 |
| 5,044,896 A * | 9/1991 | Genster | | 417/365 |
| 5,087,176 A | 2/1992 | Wieland | | |
| 5,638,796 A | 6/1997 | Adams, III et al. | | |
| 5,997,264 A * | 12/1999 | Klein et al. | | 417/420 |
| 6,231,302 B1 | 5/2001 | Bonardi | | |
| 6,616,424 B2 * | 9/2003 | Raiser | | 417/411 |
| 6,869,212 B2 * | 3/2005 | Uesugi et al. | | 366/164.6 |
| 7,836,694 B2 * | 11/2010 | Arnold | | 60/605.3 |
| 2004/0178688 A1* | 9/2004 | Ikegawa et al. | | 310/90 |
| 2005/0066680 A1* | 3/2005 | Hobmeyr et al. | | 62/259.2 |
| 2005/0210875 A1* | 9/2005 | Larue et al. | | 60/602 |
| 2012/0328968 A1* | 12/2012 | Honda | | 429/446 |
| 2013/0089800 A1* | 4/2013 | Merth et al. | | 429/444 |

FOREIGN PATENT DOCUMENTS

JP        S6349022 U  *  4/1988  ............. F16C 37/00

OTHER PUBLICATIONS

International Search Report including English translation dated Sep. 26, 2007 (Nine (9) pages).
PCT/ISA/237 including English translation (Seven (7) pages).

* cited by examiner

*Primary Examiner* — Devon Kramer
*Assistant Examiner* — Thomas Fink
(74) *Attorney, Agent, or Firm* — Crowell & Moring LLP

(57) ABSTRACT

A fluid flow machine includes a housing with a connecting piece for a working fluid on an intake side, and a pressure side. At least one impeller is mounted on a shaft, which is held in the housing by radial and axial bearings, and a cooling arrangement is provided for at least one bearing. A revolving part of the axial bearing is designed as a cooling fluid transportation device, wherein a suction connection leads to the intake side of the impeller.

8 Claims, 1 Drawing Sheet

FLUID FLOW MACHINE

BACKGROUND AND SUMMARY OF THE INVENTION

This application is a national stage of International Application No. PCT/EP2007/000455, filed Jan. 19, 2007, the entire disclosure of which is herein expressly incorporated by reference.

The invention relates to a fluid flow machine, especially of the type which can be used with internal combustion engines with pumps operated by exhaust gas and with the fuel supply of fuel cells with a compressor.

U.S. Pat. No. 5,087,176 discloses a turbo compressor with a compressor wheel and a turbine wheel on a hollow shaft. Air circulates through the interior of the shaft to protect the shaft bearing from overheating, and the shaft is insulated thermally against the turbine wheel. The cooling air, which is drawn in from the pressure side of the compressor, must itself be cooled with high pressures, before it can be used to cool the bearings.

With a gas supply unit for a fuel cell system according to Published U.S. patent application Ser. No. 2005/0066680 A1, a control unit and a drive unit are formed with channels, through which a cooling medium flows. A part of the channels is assigned to the mounting of a rotor of the drive unit. The combustion gas supply for the fuel cell system takes place in such a manner that the combustion gas has an additional cooling effect on the rotor bearing. The combustion gas is conducted along the bearing by the suction effect of an impeller of a turbo compressor.

One object of the present invention is to provide a fluid flow machine which improved efficiency and an improved cooling effect on the bearings, with little complexity.

This and other objects and advantages are achieved by the fluid flow machine according to the invention, in which the shaft of an impeller is held in radial bearings and in an axial bearing. The axial bearing comprises a revolving part which acts as a cooling fluid transport device. The cooling fluid is transported from the intake side of the impeller to bearing parts of the shaft, and to further components to be cooled. The bearings can be formed as roller bearings, sleeve bearings or gas bearings.

The revolving part may comprise a disk which is seated on the shaft in a torque-proof manner. It can be equipped for transporting the cooling fluid with blades, or it can have helical channels. The disk can especially have hollow chambers in which channels guide the fluid in the direction of a bearing surface. The channels or radial bores are preferably flown through in a radial manner.

The shaft is formed hollow in an advantageous embodiment, and the cooling fluid flows through the interior of the shaft.

The part of the axial bearing formed as a cooling fluid transportation device does not compress the cooling fluid to such an extent as the working fluid on the pressure side of the impeller. The cooling fluid is taken in on the intake side of the impeller, where the pressure and temperature are in regions which allow an improvement of the efficiency, as no working fluid is branched off from the pressure side. The part of the working fluid taken in as cooling fluid has a lower temperature than the working fluid on the pressure side, so that the bearings over which the cooling fluid flows can be cooled efficiently.

In a particularly advantageous arrangement of the invention, the impeller is driven by an electric machine. Moreover, it is also particularly advantageous if the electric machine, which typically operates as an engine, is cooled by the transported cooling fluid. The above-mentioned advantages then result with regard to the transportation and the pressure level also for the cooling fluid used for cooling the engine. The engine cooling can also be realized without additional cooling medium transportation.

If the fluid flow machine is driven by a turbine impeller, or the drive is supported at least by means of a turbine impeller, it is possible to transport cooling fluid by means of blades on the rear side of the turbine impeller, either alternatively or in addition to the cooling medium transportation part. In this case, the cooling fluid transported from the intake side of the compressor impeller can be supplied to the expansion process of the turbine.

Other objects, advantages and novel features of the present invention will become apparent from the following detailed description of the invention when considered in conjunction with the accompanying drawings.

DETAILED DESCRIPTION OF THE DRAWINGS

Figure 1:
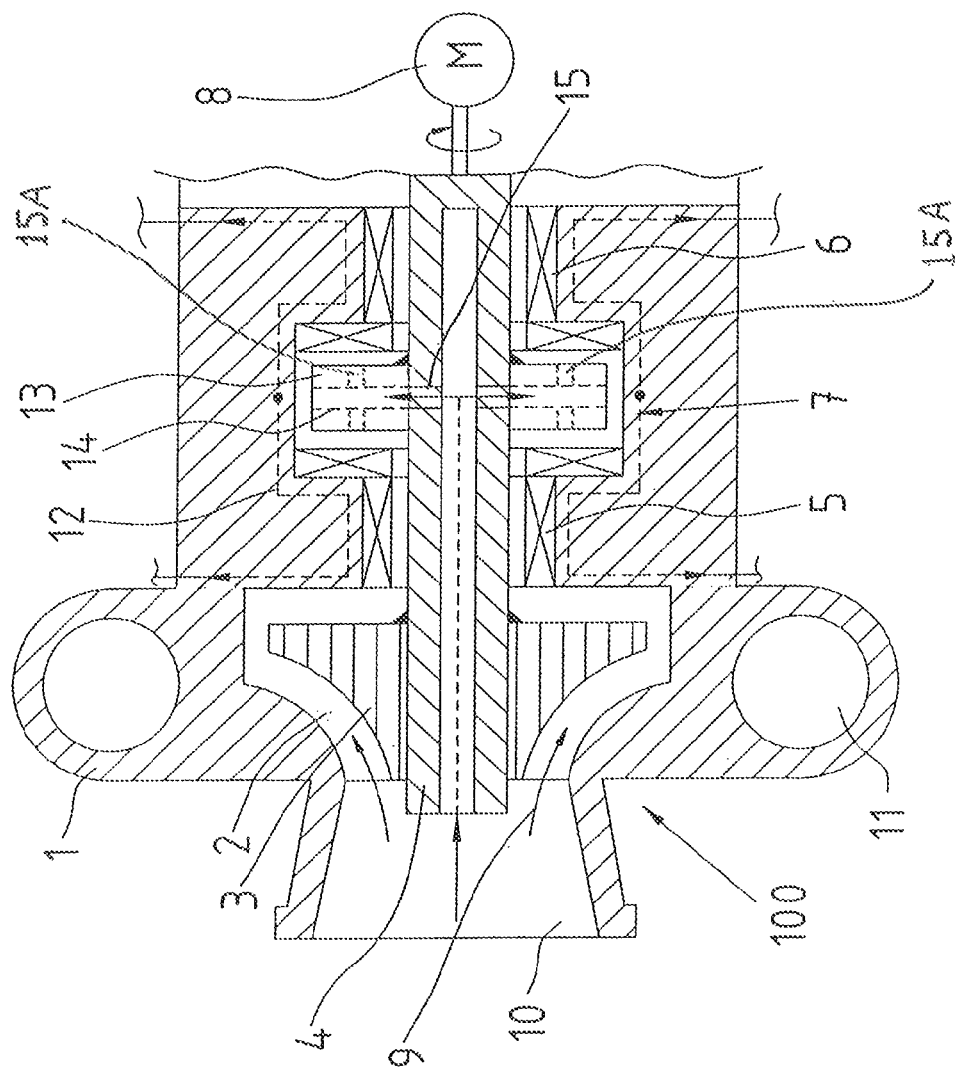
FIG. 1 is a diagram of a cooling arrangement for the mounting of an impeller of a compressor unit of a fuel cell arrangement.

As can be seen from FIG. 1, the compressor unit 100 has a housing 1 which forms a compression chamber 2. An impeller 3, which rotates in the compression chamber 2, is secured on a hollow shaft 4, which in turn is held in the housing 1 in a rotary manner, by means of radial bearings 5, 6 and an axial bearing 7. The radial bearings 5, 6 prevent movement of the shaft 4 transverse to the axis of rotation, while the axial bearing 7 prevents a movement of the shaft 4 in the axial direction. The shaft 4 or the impeller 3 may be driven, for example, by an electric machine or an electric engine 8.

When the impeller 3 rotates, it takes in gas 9 through a connecting piece 10. On the pressure side of the impeller 3, channels 11 discharge the compressed gas 9 again. (Preferably, the gas 9 may be air, which is transported to the cathode side of the fuel cell arrangement as an oxidizing agent.)

So that the bearings 5-7 (preferably gas bearings or hydrodynamic gas bearings so-called foil hearings), are not overheated during operation of the compressor unit, combustion gas 9, which is taken from the connecting piece 10, flows through cooling channels 12 which are arranged in the housing 1 along the hearing surfaces of the bearings 5-7. To transport the gas 9 through the cooling channels 12, channels 14, which exert an intake effect on the gas 9 pass through a disk 13 of the axial bearing 7. The disk 13 is mounted on the shaft 4 in a torque-proof manner. Radial bores 15 in the shaft 4 connect the interior of the shaft 4 to the channels 14. Axial bores 15A connected to the radial bores 15 can also be provided in the disk 13, to enable a gas passage through the disk 13 in the axial direction (in the region of the bearings 7).

During operation of the compressor unit, a small part of the gas 9, which is relatively cool compared to the pressure side, is branched off from the connecting piece 10 by the revolving disk 13 for cooling purposes. It flows through the hollow shaft 4, the bores 15 and the channels 14, 12, and withdraws part of the heat from the bearings 5-7, so that the cooled bearings 5-7 have an increased life cycle. The gas 9 coming from the channels 12 can for example be supplied to the cathode side of the fuel cell arrangement as an oxidizing agent. A combustion gas or a use on the hydrogen side would be feasible in principle. The gas 9 would then be supplied to the anode side.

The electric engine 8 can also be cooled by the cooling fluid (not shown in FIG. 1). A cooled electric engine or machine 8 has the advantage over an uncooled engine, that possible losses which occur in the form of heat, are discharged and thus cannot damage the machine 8. The electrical effort during the activation, especially the accuracy of the sine waves (e.g., with a synchronous engine), can thereby be reduced. Possible electrical losses due to "bad" sine waves etc. can be discharged with a minimal effort and with a minimal installation space, without damaging (e.g., demagnetization) the electric machine 8. The constructive arrangements of such a cooling can thereby be seen easily by the expert, e.g., a transport of the cooling fluid near the shaft through slots or through a hollow shaft, preferably to the rotor of the electric engine 8.

Figure 2:
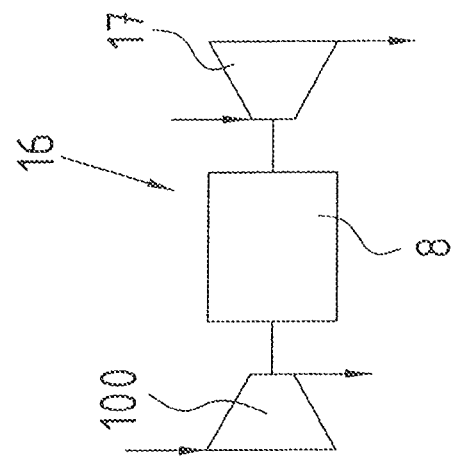
FIG. 2 is a schematic depiction of an electric turbocharger.

FIG. 2 shows a preferred use of the fluid flow machine, described here as an electric turbocharger (Electronic Turbo Charger=ETC) 16. It consists essentially of the compressor unit 100, the electric machine 8 and a turbine wheel 17 (not shown in detail here), as is for example known from turbochargers used with internal combustion engines. The ETC 16 typically supplies the cathode region of a fuel cell arrangement with an oxidizing agent, which may be, for example, air, a mixture of fresh air and exhaust air, or exhaust gas from the fuel cell arrangement. The exhaust gases from the fuel cell arrangement are thereby guided to the turbine wheel 17. In this manner, pressure energy present in the system can be recovered by the turbine wheel 17. It is also feasible to combust the exhaust gases, possibly with addition of further fuel after the fuel cell arrangement, so as to increase their energy content and to increase the energy yields at the turbine wheel.

The ETC 16 can thereby be driven via the turbine wheel 17 and via the electric machine 8, depending on how much energy is available at the turbine wheel and how much is momentarily needed for the compression of the oxidizing agent. The electric machine 8 can also be operated in a regenerative manner with an energy surplus which may be present at the turbine wheel 17 at the particular moment or under the particular operating conditions. The electric power generated in such a manner is then also available.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

List of the Reference Numerals Used

100 Compressor unit
1 Housing
2 Compression chamber
3 Impeller
4 Shaft
5, 6 Radial bearings
7 Axial bearing
8 Electric machine
9 Combustion gas
10 Connecting piece
11 Channel
12 Cooling channel
13 Disk
14 Channel
15 Bore
16 ETC
17 Turbine wheel

The invention claimed is:

1. A system comprising:
   a fuel cell having a cathode;
   a fluid flow machine comprising:
      a housing with a compression chamber inside of the housing;
      a connecting piece for receiving a working fluid on an intake side of the compression chamber;
      a shaft that is held in the housing by radial and axial bearings;
      at least one impeller mounted on said shaft and configured in the compression chamber inside of the housing; and
      a cooling arrangement for at least one of the radial and axial bearings, comprising:
         a cooling fluid transport device that comprises a revolving part of the axial bearing;
         cooling channels arranged in the housing; and
         a suction connection of said revolving part leads to the intake side of the impeller;
   wherein the radial and axial bearings are located outside of the compression chamber,
   wherein the revolving part comprises a disk that is arranged on the shaft in a torque-proof manner,
   wherein the disk comprises radial bores and axial bores connected to the radial bores for transporting the cooling fluid, and
   wherein the cooling channels receive the cooling fluid from the disk of the axial bearing and provide the cooling fluid as an oxidant to the cathode of the fuel cell.

2. The system according to claim 1, wherein the disk has channels which transport the cooling fluid.

3. The system according to claim 2, wherein the channels are disposed substantially radially in said disk.

4. The system according to claim 1, wherein the shaft is hollow and its interior acts as a cooling fluid duct.

5. The system according to claim 1, wherein the impeller is driven by an electric machine.

6. The system according to claim 5, wherein the cooling fluid also cools the electric machine.

7. An electric turbocharger comprising:
   an electric machine and a turbine wheel; and a system according to claim 1.

8. A system comprising:
   a fuel cell having a cathode;
   a fluid flow machine comprising:
      a housing;
      a shaft which is rotatably supported on radial and axial bearings in said housing;
      an impeller mounted on said shaft; and
      an intake port through which said fluid flows to said compression chamber;
   wherein,
   said axial bearing includes a disk, which is mounted on said shaft in a torque proof manner;
   said shaft has a longitudinal bore which is open to the intake port at one end thereof, as well as radial bores which connect with the axial bore;
   said disk has substantially radially disposed channels which connect at one end thereof with the radial bores in the shaft, and which open at a radial extremity thereof to cooling channels which are arranged in said housing along bearing surfaces of the radial and axial bearings, whereby cooling gas flows from said intake port, through the longitudinal and radial bores of the shaft, and through the channels of said disk, to said cooling channels, and said disk includes radial bores and axial bores connected to the channels of the disk for transporting the cooling gas; and said cooling channels supply the cooling gas received from the channels of the disk as oxidant to the cathode of the fuel cell.

* * * * *